United States Patent [19]

Kremer

[11] Patent Number: 5,406,401
[45] Date of Patent: Apr. 11, 1995

[54] APPARATUS AND METHOD FOR SELECTIVE TRIBUTARY SWITCHING IN A BIDIRECTIONAL RING TRANSMISSION SYSTEM

[75] Inventor: Wilhelm Kremer, Dracut, Mass.

[73] Assignee: AT&T Corp., Murray Hill, N.J.

[21] Appl. No.: 955,789

[22] Filed: Oct. 2, 1992

[51] Int. Cl.$^6$ ............................ H04J 1/16; H04L 1/00
[52] U.S. Cl. ..................................... 359/110; 359/118; 359/119; 370/15; 370/16; 370/16.1; 370/85.5; 370/85.15; 371/7; 371/8.2; 340/825.05; 340/825.15; 340/825.16
[58] Field of Search ............... 370/16, 16.1, 84, 85.12, 370/14, 15, 16, 16.1, 85.5, 85.15; 340/825.05, 825.15, 825.16, 827; 359/110, 111, 118, 119; 371/7, 8, 11

[56] References Cited

U.S. PATENT DOCUMENTS

| | | | |
|---|---|---|---|
| 4,195,351 | 3/1980 | Barner et al. | 364/900 |
| 4,538,264 | 8/1985 | Bahr et al. | 371/8 |
| 4,553,233 | 11/1985 | Debuysscher et al. | 370/16 |
| 4,835,763 | 5/1989 | Lau | 370/16 |
| 4,855,993 | 8/1989 | Hamada et al. | 370/16 |
| 5,113,398 | 5/1992 | Howes | 371/11.2 |
| 5,153,874 | 10/1992 | Kohno | 370/13 |
| 5,159,595 | 10/1992 | Flanagan et al. | 370/85.15 |

OTHER PUBLICATIONS

Baroni et al. "SonetLine Protection Switched Ring APS Protocol", Feb. 6, 1991.
"Sonet Line Protection Switched Ring APS Protocol", T1X1.5/91-026, J. Baroni et al., AT&T Network Systems.
"Sonet Ring Applications for Survivable Fiber Loop Networks", *IEEE Communications Magazine*, Jun. 1991, J. Sosnosky et al. pp. 51–58.
"Further Considerations on 2-Fiber Bidirectional Line Switched OC-48 Rings", Contribution to T1 Standards Project-T1X1.5/91-019, G. Copley et al.
"Sonet Add-Drop Multiplex Equipment (SONET ADM) Generic Criteria for a Unidirectional Path Protection Switched, Self-Healing Ring Implementation", TA-tsy-000496, Issue 3, Aug. 1990, Bellcore.
"Sonet Rings: Proposal for K Byte Definition", Contribution to T1 Standards Project-T1X1.5, Nov. 5, 1990, G. Copley et al.
Co-pending U.S. Patent Application W. Kremer Case 1, Ser. No. 07/855,795, filed Mar. 26, 1992.
Co-pending U.S. Patent Application W. Kremer Case 2, Ser. No. 07/892,105, filed Mar. 26, 1992.
Co-pending U.S. Patent Application W. C. Marra et al. Case 1-1-1, Ser. No. 07/892,079, now U.S. Pat. 5,341,364 filed Jun. 2, 1992.
Co-pending U.S. Patent Application W. Kremer Case 3, Ser. No. 07/892,105, now U.S. Pat 5,278,824, filed Jun. 2, 1992.

*Primary Examiner*—Richard E. Chilcot, Jr.
*Assistant Examiner*—Richard A. Moller
*Attorney, Agent, or Firm*—Thomas Stafford; Mark K. Young

[57] ABSTRACT

Selective tributary switching is realized in a bidirectional transmission system by selectively switching, in accordance with the same rules governing the set-up and take down procedures of full line-switching, only that portion of the bandwidth of the particular line which has been provisioned to be line-switched. The remaining bandwidth can be left unprotected or, by for the first time combining line-switched ting functionality with path-switched ring functionality in the same ring transmission system, some remaining bandwidth can be path-switched. Furthermore, another degree of switching freedom is achieved in a four optical fiber bidirectional ring transmission system by selectively span-switching, but not ring-switching, specific bandwidth on the line. To this end, communications circuit provisioning information is provided in the ring nodes as to whether a particular communications circuit should be line-switched or not and, if not, whether it should be span-switched, path-switched or left unprotected.

40 Claims, 8 Drawing Sheets

RING NODE ID TABLE

| NODE ID |
|---------|
| 101 ID  |
| 102 ID  |
| 103 ID  |
| 104 ID  |

FIG. 6

COMMUNICATIONS CIRCUIT ID TABLE FOR RING NODE 104

| STS-M # | A TERMINATION | Z TERMINATION | LINE-SWITCHED | PATH-SWITCHED |
|---------|---------------|---------------|---------------|---------------|
| b | 104 | 102 | YES | NO |
| c | 103 | 101 | YES | NO |
| d | 102 | 101 | YES | NO |
| e | 103 | 102 | NO | YES |
| f | 103 | 104 | NO | YES |
| ⋮ | ⋮ | ⋮ | ⋮ | ⋮ |

FIG. 7   COMMUNICATIONS CIRCUIT ID TABLE FOR RING NODE 104

| STS-M # | A TERMINATION | Z TERMINATION | LINE-SWITCHED | PATH-SWITCHED | SPAN-SWITCHED |
|---|---|---|---|---|---|
| b | 104 | 102 | YES | NO | NO |
| c | 103 | 101 | YES | NO | NO |
| d | 102 | 101 | YES | NO | NO |
| e | 103 | 102 | NO | YES | NO |
| f | 103 | 104 | NO | YES | YES |
| g | 104 | 103 | NO | NO | NO |
| h | 104 | 101 | NO | NO | NO |
| ... | ... | ... | ... | ... | |

APPARATUS AND METHOD FOR SELECTIVE TRIBUTARY SWITCHING IN A BIDIRECTIONAL RING TRANSMISSION SYSTEM

TECHNICAL FIELD

This invention relates to ring transmission systems and, more particularly, to bidirectional ring transmission systems.

BACKGROUND OF THE INVENTION

It has become increasingly important to maintain communications connectivity in the presence of transmission system failures. To this end, path-switched ring type transmission systems and, more recently, bidirectional line-switched ring type transmission systems have been proposed that heal communications circuits in the presence of equipment failures, fiber cuts and node failures. Bidirectional line-switched ring transmission systems have a capacity advantage over path-switched ring transmission systems for all communications traffic patterns except a so-called simple hubbed traffic pattern, where the path-switched and line-switched ring transmission systems have the same capacity. On the other hand, a path-switched ring transmission system provides circuit presence at every ring node on the ring transmission system for each communications circuit being transported on the ring. In a bidirectional line-switched ring transmission system, circuit presence at every ring node for communications circuits propagating on the ring can only be established by employing twice the bandwidth as that used for the same communications circuits in the path-switched ring transmission system. Additionally, in the bidirectional line-switched ring transmission system, all service bandwidth is ring-protection-switched when necessary, and it is not possible to leave any of the bandwidth unprotected by ring switching.

SUMMARY OF THE INVENTION

The problems related to inefficient universal communications circuit presence and of lack of bandwidth unprotected by ring switching in a bidirectional line-switched transmission system are overcome, in accordance with the principles of the invention, by selectively switching, in accordance with the same rules governing the set-up and take down procedures of full line-switching, only that portion of the bandwidth of the particular line which has been provisioned to be ring-switched. In accordance with the invention, the remaining bandwidth can be left unprotected or path-switched on a communications-circuit-by-communications-circuit basis, thereby, for the first time, line-switched ring functionality is combined with path-switched ring functionality in the same ring transmission system. Furthermore, in accordance with the invention, another degree of switching freedom is achieved in a four-optical-fiber bidirectional line-switched ring transmission system by selectively span-switching, but not ring-switching, specific bandwidth on the line. To this end, communications circuit provisioning information is provided in the ring nodes as to whether a particular communications circuit should be line switched or not and, if not, whether it should be path-switched, span-switched or not switched, i.e., left unprotected. Thus, a determination can be made, in accordance with the principles of the invention, on a communications-circuit-by-communications-circuit basis whether an individual communications circuit on the ring should be protection switched and, if so, the type of switching to be effected.

DETAILED DESCRIPTION

Figure 1:
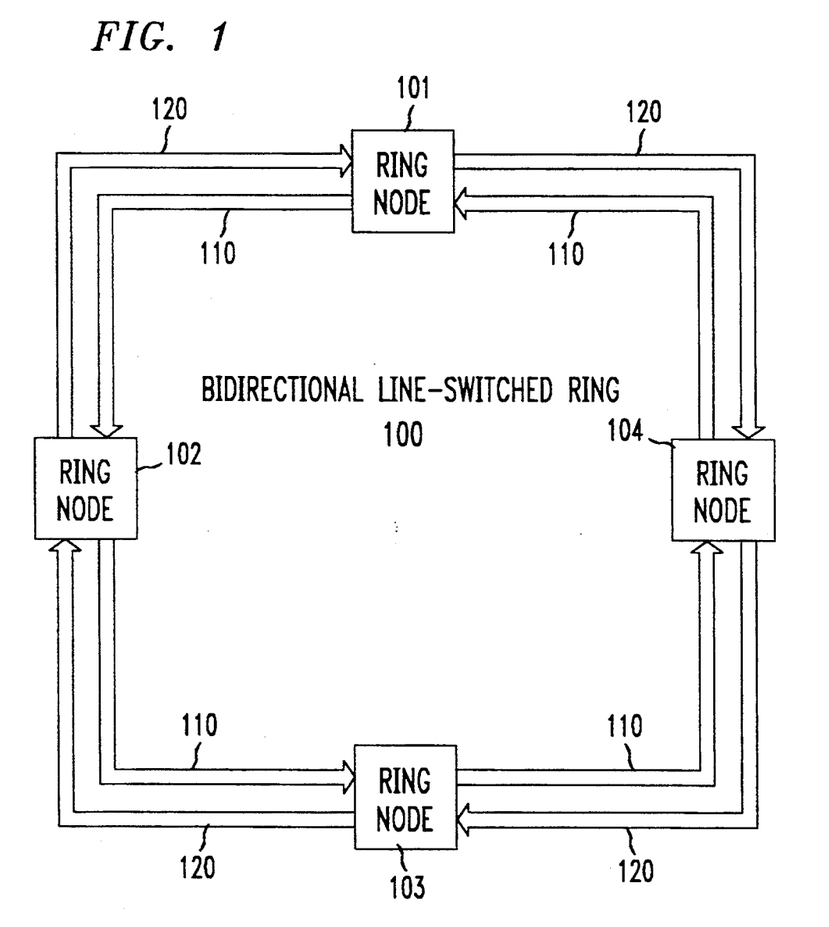
FIG. 1 shows, in simplified block diagram form, a ring transmission system including the invention.

FIG. 1 shows, in simplified form, a bidirectional ring transmission system, in this example bidirectional line-switched-ring transmission system 100, which for brevity and clarity of exposition is shown as including only ring nodes 101 through 104, each incorporating an embodiment of the invention. Ring nodes 101 through 104 are interconnected by transmission path 110 in a counter-clockwise direction and by transmission path 120 in a clockwise direction. In this example, transmission paths 110 and 120 are comprised of optical fibers and each could be comprised of a single optical fiber or two (2) optical fibers. That is, bidirectional line-switched ring transmission system 100 could be either a two (2) optical fiber or a four (4) optical fiber system. In a two (2) optical fiber system, each of the fibers in transmission paths 110 and 120 includes service bandwidth and protection bandwidth. In a four (4) optical fiber system, each of transmission paths 110 and 120 includes an optical fiber for service bandwidth and a separate optical fiber for protection bandwidth. Such bidirectional line-switched ring transmission systems are known. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 110 and 120. The SONET digital signal formats are described in a Technical Advisory entitled "Synchronous Optical Network (SONET) Transport Systems: Common Generic Criteria", TA-NWT-000253, Bell Communications Research, Issue 6, September 1990.

It is noted that requests and acknowledgments for protection switch action are transmitted in an automatic protection switch (APS) channel in the SONET overhead accompanying the protection bandwidth on each of transmission paths 110 and 120. The APS channel, in the SONET format, comprises the K1 and K2 bytes in the SONET overhead of the protection bandwidth. The K1 byte indicates a request of a communications circuit for switch action. The first four (4) bits of the K1 byte indicate the switch request priority and the last four (4) bits indicate the ring node identification (ID). The K2 byte indicates an acknowledgment of the requested protection switch action. The first four (4) bits of the K2 byte indicate the ring node ID and the last 4 bits indicate the action taken. For purposes of this description, a "communications circuit" is considered to be a SONET STS-3 digital signal having its entry and exit points on the ring.

Each of ring nodes 101 through 104 comprises an add-drop multiplexer (ADM). Such add-drop multiplexer arrangements are known. For generic requirements of a SONET based ADM see the Technical Reference entitled "SONET ADD-DROP Multiplex Equipment (SONET ADM) GENERIC CRITERIA", TR-TSY-000496, Issue 2, September 1989, Supplement 1, September 1991, Bell Communications Research. In this example, the ADM operates in a transmission sense to pass signals through the ring node, to add signals at the ring node, to drop signals at the ring node, to bridge signals during a protection switch and to loop-back-switch signals during a protection switch at the ring node.

Figure 2:
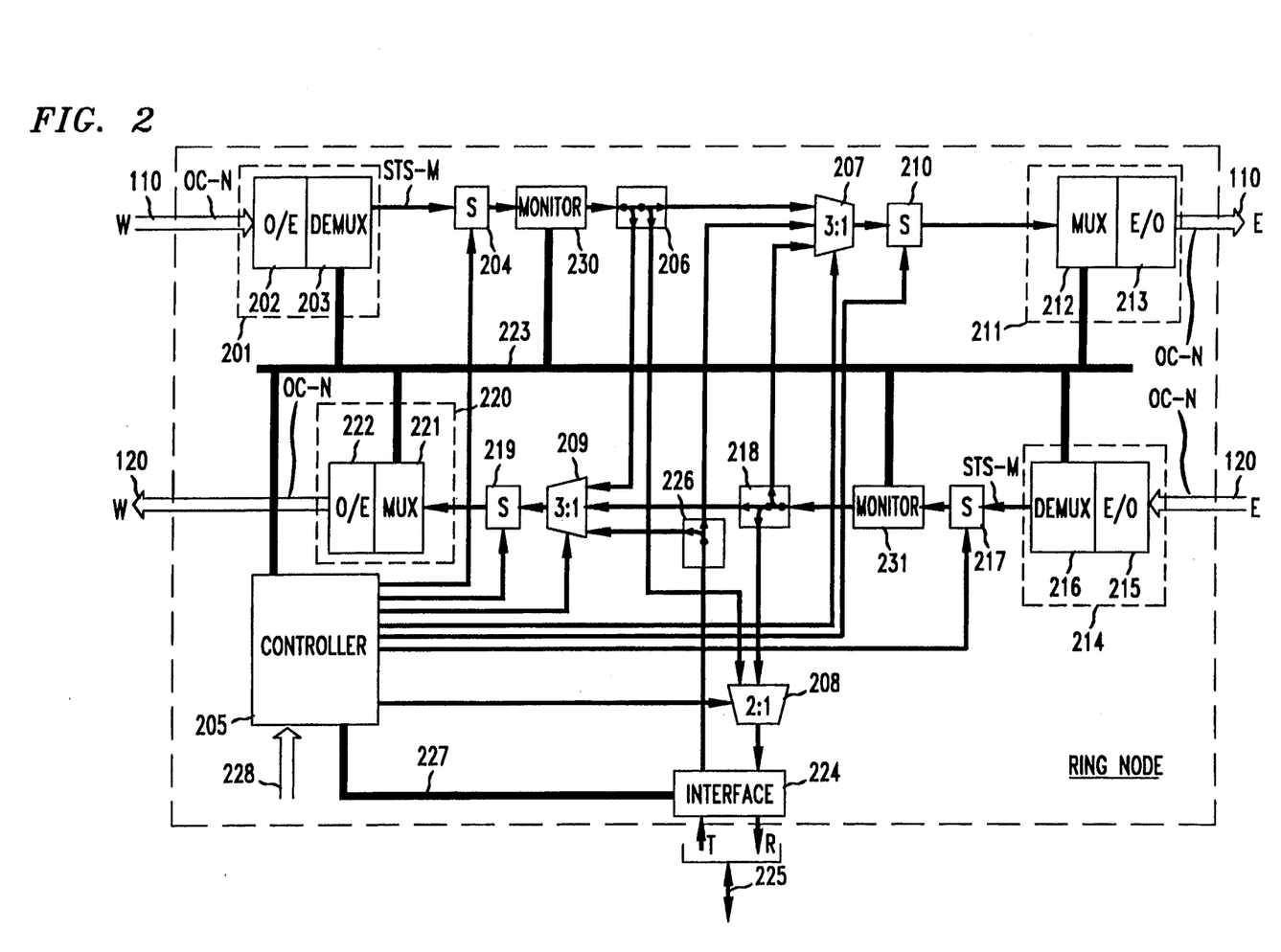
FIG. 2 shows, in simplified block diagram form, details of a ring node including an embodiment of the invention.
Figure 3:
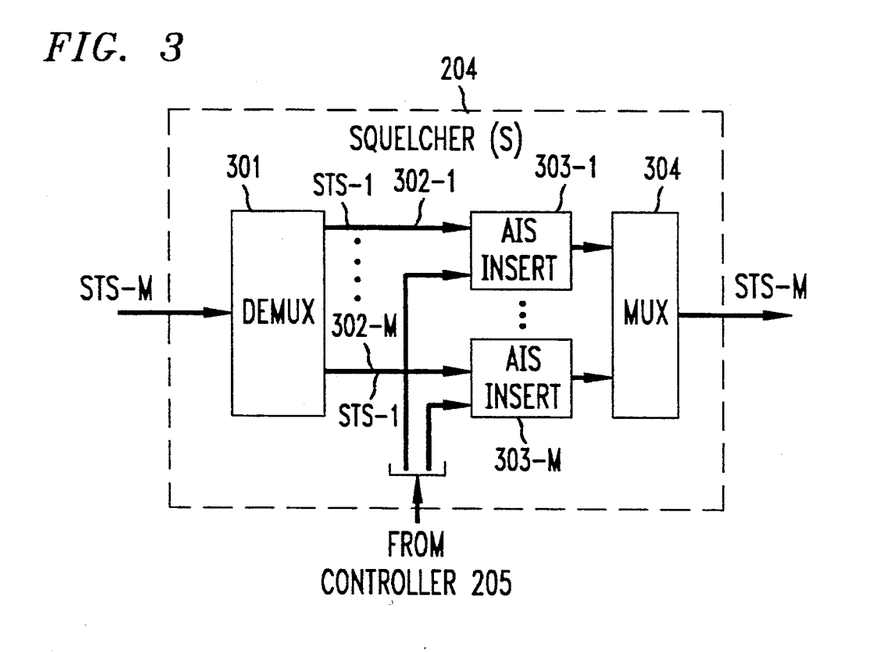
FIG. 3 shows, in simplified block diagram form, details of a squelcher used in the ring node of FIG. 2.
Figure 4:
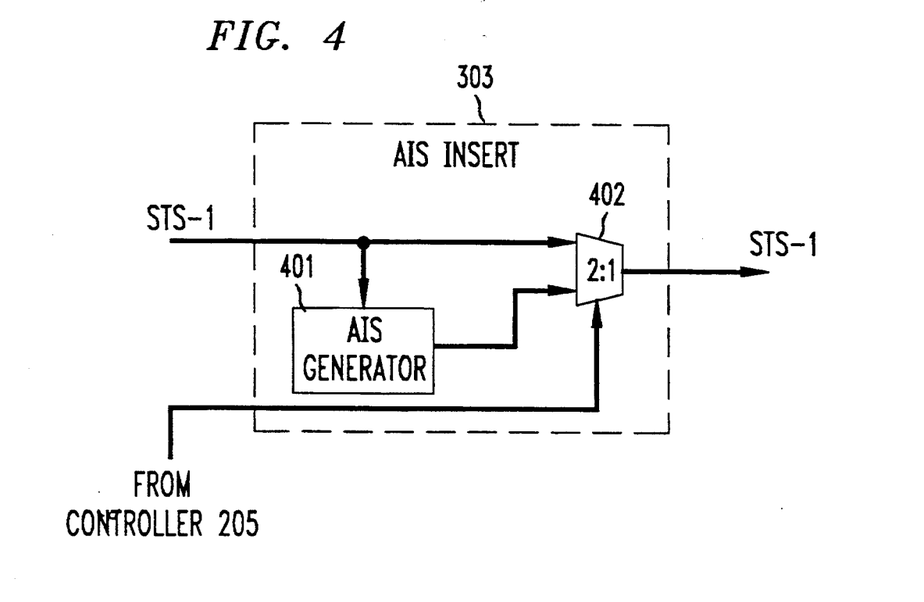
FIG. 4 shows, in simplified block diagram form, details of an AIS insert unit employed in the squelcher of FIG. 3.

FIG. 2 shows, in simplified block diagram form, details of ring nodes 101 through 104, including an embodiment of the invention. In this example, a west(W)-to-east(E) digital signal transmission direction is assumed in the service bandwidth and the protection bandwidth on transmission path 110. It will be apparent that operation of the ring node and the ADM therein would be similar for an east(E)-to-west(W) digital signal transmission direction in the service bandwidth and the protection bandwidth on transmission path 120. Specifically, shown is transmission path 110 entering the ring node and supplying an OC-N SONET optical signal to receiver 201, where N could be, for example, 12 or 48. Receiver 201 includes an optical/electrical (O/E) interface 202 and a demultiplexer (DEMUX) 203, which yields at least one (1) STS-M SONET digital signal. Such O/E interfaces and demultiplexers are known. In this example, M is assumed to be three (3) and N is greater than M. In order to accomplish line-switching in a two optical fiber bidirectional line-switched ring transmission system, M must be a divisor of N/2. In accordance with the principles of the invention, however, M must be no greater than the tributary level which it is desired to path protection switch. The STS-M signal output from DEMUX 203 is supplied to squelcher (S) 204 which, under control of controller 205 controllably squelches, i.e., blocks, particular incoming communications circuits by inserting an alarm indication signal (AIS), as described below. Details of squelcher (S) 204 are shown in FIGS. 3 and 4 and its operation is described below. Thereafter, the STS-M signal, squelched or otherwise, is supplied to monitor element 230 and to broadcast element 206. Monitor element 230 checks the passing communication circuit signal for conditions such as loss of signal (LOS) or for parameters such as a bit error rate (BER). Such monitor elements are known in the art. A broadcast element replicates the STS-M signal supplied to it and supplies the replicated signals as a plurality of individual outputs. Such broadcast elements are known. Broadcast element 206 generates three identical STS-M signals and supplies one STS-M signal to an input of 3:1 selector 207, a second STS-M signal to an input of 2:1 selector 208 and a third STS-M signal to an input of 3:1 selector 209. An STS-M signal output from 3:1 selector 207 is supplied to squelcher (S) 210, which is identical to squelcher (S) 204. Squelcher (S) 210 is employed, under control of controller 205, to squelch particular outgoing communications circuits. The STS-M signal output from squelcher (S) 210 is supplied to transmitter 211 and, therein, to multiplexer (MUX) 212. The output of MUX 212 is an electrical OC-N digital signal, which is interfaced to transmission path 110 via electrical/optical (E/O) interface 213. Such multiplexers (MUXs) and electrical/optical (E/O) interfaces are well known.

Similarly, in the east(E)-to-west(W) direction an OC-N optical signal is supplied via transmission path 120 to receiver 214 and, therein, to optical/electrical (O/E) interface 215. In turn, demultiplexer (DEMUX) 216 yields a STS-M signal which is supplied via squelcher (S) 217 to monitor element 231 and then to broadcast element 218. Broadcast element 218 replicates the STS-M signal into a plurality of identical STS-M signals, in this example, three (3). One STS-M signal is supplied to an input of 3:1 selector 207, a second STS-M signal is supplied to an input of 2:1 selector 208 and a third STS-M signal is supplied to an input of 3:1 selector 209. An output from 3:1 selector 209 is supplied via squelcher (S) 219 to transmitter 220. In transmitter 220, multiplexer (MUX) 221 multiplexes the STS-M into an electrical OC-N and, then, electrical/optical (E/O) interface 222 supplies the optical OC-N signal to transmission path 120.

Controller 205 operates to effect the provisioned line-switching and deterministic squelching of communications circuits, or path-switching, in accordance with the principles of the invention. Additionally, as indicated below, a restriction to span-switching of a particular communications circuit can also be realized in a four fiber bidirectional line-switched ring transmission system, in accordance with another aspect of the invention. Controller 205 communicates with receivers 201 and 214 and transmitters 211 and 220 via bus 223 and with interface 224 via bus 227. Specifically, controller 205 monitors the incoming digital signals to determine loss-of-signal, SONET format K bytes and the like. Additionally, controller 205 causes the insertion of appropriate K byte messages for protection switching purposes, examples of which are described below. To realize the desired deterministic squelching of the communications circuits, controller 205 is advantageously provisioned via bus 228 with the identities (IDs) of all the communications circuits passing through the ring node, as well as those communications circuits being added and/or dropped at the ring node and the identities of all the ring nodes in bidirectional line-switched ring 100. The squelching of communications circuits under control of controller 205 to effect the invention is described below. Controller 205 communicates with monitors 230 and 231 to compare the health of two copies of an incoming path-switched communications circuit, and then instructs selector 208 to pick the better of the two copies.

Interface 224 is employed to interface to a particular duplex link 225 and could include any desired arrangement. For example, interface 224 could include a DS3 digital signal interface to a DSX, an STS-1E (electrical) SONET digital signal interfacing to a DSX, an optical extension interface to an OC-N SONET optical signal or the like. Such interface arrangements are known. Specifically, a signal (R) to be dropped at the ring node is supplied to interface 224 via 2:1 selector 208, under control of controller 205, from either broadcast element 206 or broadcast element 218. In turn, interface 224 supplies the appropriate signal to duplex link 225. A signal (T) to be added at the ring node is supplied from duplex link 225 to interface 224 where it is convened to the STS-M digital signal format, if necessary. The STS-M digital signal is then supplied to broadcast element 226 where it is replicated. The replicated STS-M digital signals are supplied by broadcast element 226, to an input of 3:1 selector 207 and an input of 3:1 selector 209. In this example, 3:1 selectors 207 and 209, under control of controller 205, select the signal being added for transmission in the service bandwidth or the protection bandwidth on either transmission path 110 or transmission path 120.

It should be noted that, in this example, the normal transmission path for a digital signal being added at the ring node would be in the service bandwidth on transmission path 120, for example, towards the west (W). The following describes the procedure for those communications circuits which are to be line-switched, if there were to be a protection switch. The signal (T) being added from interface 224 would be bridged via broadcast element 226 and chosen by 3:1 selector 207, under control of controller 205, to the protection bandwidth on transmission path 110. Similarly, if there were to be a loop-back protection switch and the ring node was adjacent to the failure, the signal (R) to be dropped at the ring node would be received in the protection bandwidth on transmission path 120 and would be switched from broadcast element 218 via 2:1 selector 208 to interface 224. It is noted that "failure" or "ring node failure" as used herein is intended to include node equipment failure and so-called node isolation failure caused by optical fiber cuts, cable cuts or the like. Otherwise, the signal (R) to be dropped would be switched in a ring node adjacent the failure from the protection bandwidth on transmission path 120 to the service,bandwidth on transmission path 110 and received at the ring node in usual fashion. Then, the signal (R) being dropped from transmission path 110 is supplied via broadcast element 206 and 2:1 selector 208 to interface 224.

As indicated above, controller 205 monitors the status of interface 224 and the digital signal supplied thereto via bus 227. Specifically, controller 205 monitors interface 224 for loss-of-signal, coding violations and the like, i.e., a signal failure condition.

Under control of controller 205, as previously noted, digital signals may be passed through, added at, dropped at, bridged at or loop-back-switched at the ring node. A loop-back-switch of an STS-M digital signal incoming in the service bandwidth on transmission path 110 is effected by controller 205 causing 3:1 selector 209 to select the STS-M digital signal from broadcast element 206 and supplying it via squelcher (S) 219 to transmitter 220. In turn, transmitter 220 supplies an OC-N optical signal to the protection bandwidth on transmission path 120. It will be apparent that in the loop-back-switch operation, if the signal is incoming in a service bandwidth on transmission path 110, it will be loop-back-switched to the protection bandwidth on transmission path 120 and vice versa. If the signal is incoming in protection bandwidth on transmission path 110, it will be loop-back-switched to the service bandwidth on transmission path 120 and vice versa. A signal to be added at the ring node is supplied from interface 224, replicated via broadcast element 226 and selected either by 3:1 selector 207 or 3:1 selector 209, under control of controller 205, to be added on transmission path 110 or transmission path 120, respectively. A digital signal to be dropped at the ring node is selected by 2:1 selector 208, under control of controller 205, either from broadcast element 206 (transmission path 110) or broadcast element 218 (transmission path 120). The pass-through and loop-back-switch functions for a signal incoming on transmission path 120 is identical to that for an incoming signal on transmission path 110.

Possible communications circuit misconnections are avoided in bidirectional line-switched ring 100 by deterministically squelching communications circuits to be line-switched that are terminated in a failed ring node in ring nodes adjacent to the failed ring nodes(s). The adjacent failed ring nodes can include a plurality of nodes including those that appear to be failed because of being isolated by other failed ring nodes or by fiber and/or cable cuts. To this end, each ring node in bidirectional line-switched ring transmission system 100 is typically equipped to effect the desired squelching via squelchers (S) 204, 210, 217 and 219, under control of controller 205. In this example, both incoming and outgoing communications circuits are squelched, however, it may only be necessary to squelch outgoing communications circuits.

FIG. 3 shows, in simplified block diagram form, details of an exemplary squelcher (S) unit. Specifically, the STS-M digital signal is supplied to demultiplexer (DEMUX) 301 where it is demultiplexed into its constituent M STS-1 digital signals 302-1 through 302-M. The M STS-1 digital signals are supplied on a one-to-one basis to AIS insert units 303-1 through 303-M. AIS insert units 303-1 through 303-M, under control of controller 205, insert AIS in the STS-1 digital signals included in the communications circuits, i.e., STS-M digital signals, to be squelched. Details of AIS insert units 303 are shown in FIG. 4 and described below. Thereafter, the M STS-1 digital signals are multiplexed in multiplexer (MUX) 304 to yield the desired STS-M digital signal. The details of multiplex schemes for the STS-M digital signal are described in the technical advisory TA-NWT-000253, referenced above.

FIG. 4 shows, in simplified block diagram form, details of AIS insert units 303. Specifically, shown is an STS-1 digital signal being supplied to AIS generator 401 and to one input of 2:1 selector 402. AIS generator 401 operates to insert AIS in the STS-1 digital signal. As indicated in the technical advisory TA-NWT-000253, the STS path AIS is an "all ones" (1's) signal in the STS-1 overhead bytes H1, H2 and H3 and in the bytes of the entire STS SPE (synchronous payload envelope). Selector 402 selects as an output, under control of controller 205, either the incoming STS-1 digital signal or the STS-1 digital signal with AIS inserted from AIS generator 401.

Figure 5:
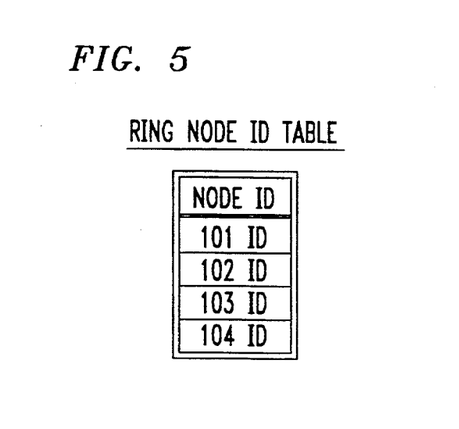
FIG. 5 is an exemplary ring node ID table included in memory of the controller of FIG. 2.

FIG. 5 is a table including the identification (ID) of ring nodes 101 through 104. The ring node IDs are stored in a look-up table which is provisioned via 228 in memory of controller 205. As indicated above, the ring node IDs are 4 bit words and are included in the second 4 bits of the K1 bytes and the first 4 bits of the K2 bytes in the APS channel.

Figure 6:
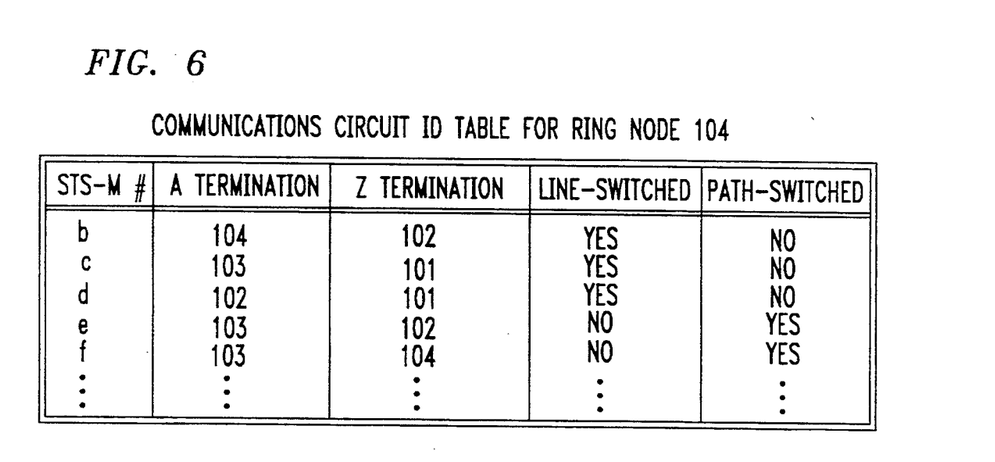
FIG. 6 is an exemplary communications circuit ID table also included in memory of the controller of FIG. 2 for ring node 104.

FIG. 6 is illustrative of a table including the identification of all the active communications circuits in a ring node, in this example, ring node 104, for a counter-clockwise communication through nodes 101 through 104 (FIG. 1). The active communications circuits include those being added, being dropped or passing through ring node 104. The table including the IDs of the active communications circuits in the ring node are provisioned via input 228 in a look-up table in memory of controller 205. Shown in the table of FIG. 6 are (a) the STS-M communications circuit numbers (#) b through f; (b) an identification of the ring node which includes the communications circuit entry point, i.e., the A termination for the communications circuit; and (c) an identification of the ring node which includes the communications circuit exit point, i.e., the Z termination for the communications circuit. Thus, the communications circuit ID table of FIG. 6, shows that STS-M(b) enters ring 100 at ring node 104 and exits at ring node 102; STS-M(c) enters ring 100 at ring node 103 and exits at ring node 101; STS-M(d) enters ring 100 at ring node 102 and exits at ring node 101; STS-M(e) enters ring 100 at ring node 103 and exits at ring node 102; and STS-M(f) enters ring 100 at ring node 103 and exits at ring node 104. Although the ring nodes designated as A terminations are considered entry points and the ring nodes designated as Z terminations are considered exit points, it will be apparent that the individual communications circuits may be duplex circuits having both entry and exit points at each such node. It should be noted that heretofore all communications circuits would be line-switched, but now it is possible, in accordance with the principles of the invention, to line-switch a subset of the communications circuits and to path-switch another subset of the communications circuits, as desired. Thus, as shown in FIG. 6, STS-M(b), STS-M(c) and STS-M(d) are provisioned, in accordance with the invention, to be line-switched and STS-M(e) and STS-M(f) are provisioned, in accordance with the invention, to be path-switched.

Figure 7:
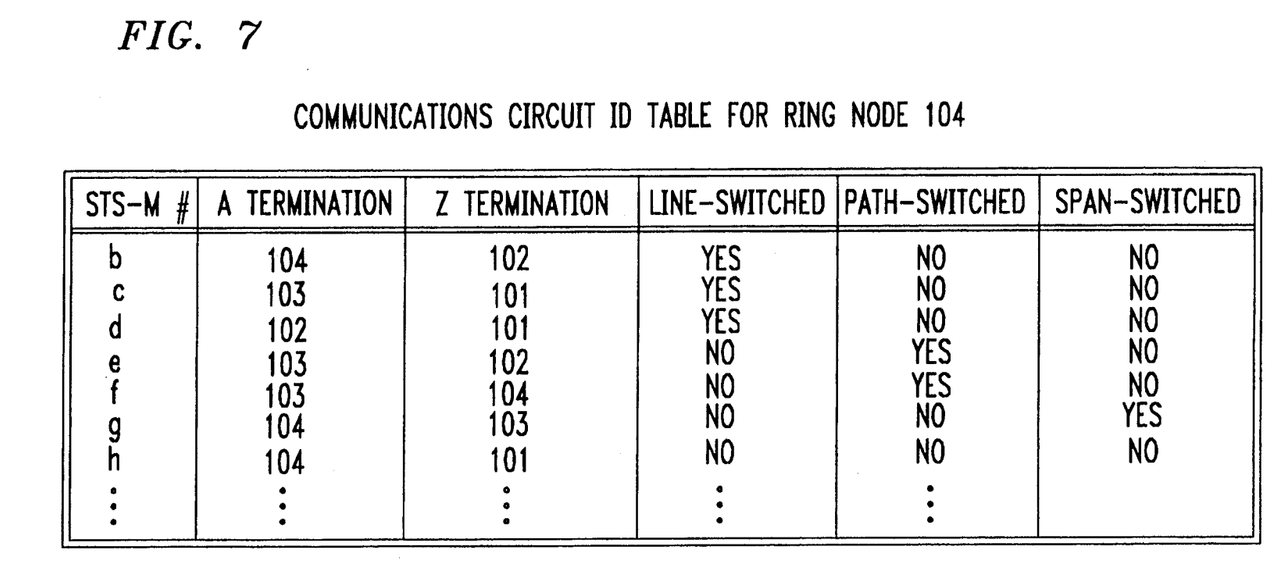
FIG. 7 is another exemplary communications circuit ID table also included in memory of the controller of FIG. 2 for ring node 104.

Also encompassed within the principles of the invention is the capability of leaving a subset of the communications circuits unprotected. And in a four optical fiber bidirectional line-switch ring transmission system, it is now also possible to specify whether span-switching of communications circuits will be employed or not. These concepts are illustrated in FIG. 7 which, is illustrative of another exemplary table including the identification of all the active communications circuits in ring node 104, for counter-clockwise communication through ring nodes 101 through 104. Specifically, FIG. 7 illustrates how unprotected or span-switched communications circuits are provisioned via input 228 in a look-up table in memory of controller 205 (FIG. 2) in a four fiber ring transmission system. Communications circuits STS-M(b) through STS-M(f) are provisioned as shown in FIG. 6 and described above. Communications circuit STS-M(g) is span-switched only, and communications circuit STS-M(h) is unprotected.

Figure 8:
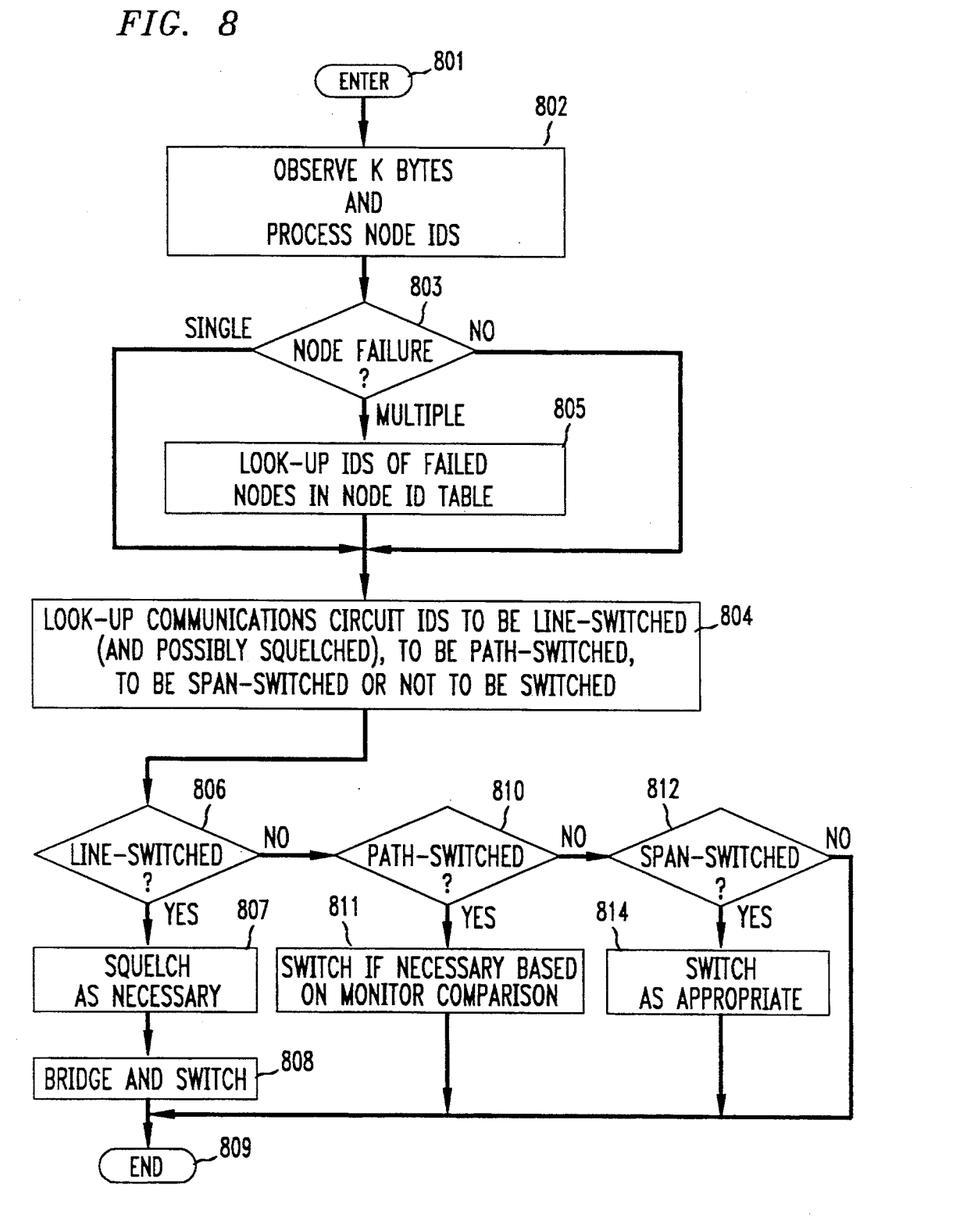
FIG. 8 is a flow chart illustrating the switching and possible squelching operation of the controller of FIG. 2.

FIG. 8 is a flow chart illustrating the operation of controller 205 in controlling the operation of the ring nodes in order to effect the provisioned switching (and the deterministic squelching, if necessary) of communications circuits in the presence of a failure, in accordance with the invention. Specifically, the process is entered via step 801. Then, operational block 802 causes the K bytes of an incoming OC-N signal to be observed and processes the ring node IDs therein. Then, conditional branch point 803 tests to determine if the processed ring node IDs indicate that one or more ring nodes have failed. Again, a ring node failure is defined as to include node equipment failure and so-called node isolation failure caused by fiber cuts and the like. Specific examples of failure conditions are discussed below. If the processed ring node IDs indicate no ring node failure, the failure is other than a ring node failure and control is passed to operational block 804. Similarly, if step 803 indicates a single ring node failure, the failed ring node ID is already known and control is also passed directly to step 804. If the processed ring node IDs indicate a multiple ring node failure, operational block 805 causes the failed ring node IDs to be obtained from the ring node ID look-up table in memory (FIG. 5). Then, as in the other two instances, control is passed to operational block 804. Operational block 804 causes the identity (ID) of the affected communications circuits to be obtained whether or not any particular such communications circuit is to be line-switched (or possibly squelched), and if not line-switched, whether or not it is to be path-switched, and if not path-switched, whether or not it is to be span-switched from the communications circuit ID look-up table (FIG. 7) in memory of controller 205 (FIG. 2). Once the affected communications circuits are identified, conditional branch points 806, 810 and 812 separate the control process depending upon whether the affected individual communications circuit should be line-switched or not, should be path-switched or not, or should span-switched or not. It should be noted that if the communications circuit is not line-switched, path-switched or span-switched, it is left unprotected, in accordance with an aspect of the invention. It will be apparent to those skilled in the art that the individual affected communications circuits can be arranged into subgroups of communications circuits to be either line-switched, path-switched, span-switched only or not switched, i.e., left unprotected. If the communications circuit is to be line-switched, as determined in step 806, operational block 807 causes, if necessary, the appropriate ones of squelchers (S) 204, 210, 217 and 219 (FIG. 2), in this example, to squelch those identified communications circuits in the ring node. As indicated above, all line-switched communications circuits active in this ring node that are terminated in a failed ring node are squelched. Operational block 808 thereupon causes the line-switched communications circuits not terminated in the failed ring node(s) to be bridged and switched to "heal" the ring. Thereafter, the process is ended in step 809. If a communications circuit is to be path-switched, as determined in steps 806 and 810, operational block 811 compares, via monitors 230 and 231 (FIG. 2), the relative health of the two copies of the particular communications circuit, and engages path-switching in selector 208 (FIG. 2), if appropriate. Thereafter, the process is ended in step 809. If the affected communications circuit is not to be either line-switched or path-switched as determined in steps 806 and 810, conditional branch point 812 tests to determine whether or not the communications circuit is to be span-switched. If the affected communications circuit is to be span-switched, operational block 814 effects the span-switching as appropriate. Thereafter, the process is ended in step 809. Again, if the affected communications circuit is to be left unprotected as determined in steps 806, 810 and 812 the process is ended in step 809.

Figure 9:
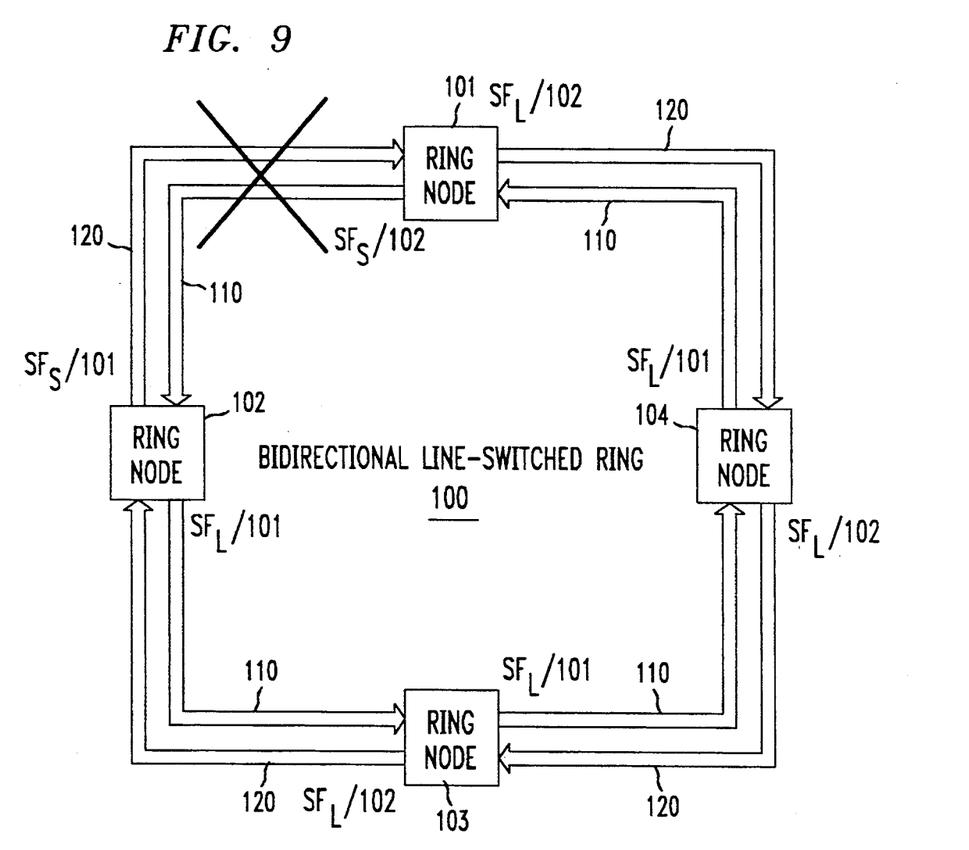
FIG. 9 illustrates the failure message transmission for a complete fiber failure in the bidirectional line-switched ring transmission system.

FIG. 9 illustrates the failure message transmission in the automatic protection switch (APS) channel K1 bytes for a transmission path failure in bidirectional line-switched ring 100. In this example, the failure is shown as being in transmission paths 110 and 120 between ring nodes 101 and 102. Ring node 101 detects loss-of-signal from ring node 102 on incoming transmission path 120. Loss-of-signal as used herein is intended to include other indicators such as loss-of-frame, high bit error rate or the like. Then, ring node 101 transmits a line-switch request message identifying the signal from ring node 102 as having failed. Specifically, the line-switch request messages are transmitted in the APS channel K1 byte on transmission path 120 away from the failure toward ring node 104. This line-switch request message is designated $SF_L/102$. Ring node 101 also transmits a span-switch request message in the APS channel K1 byte on transmission path 110 towards the failure. The span-switch request message is designated $SF_L/102$. It should be noted, however, that a span-switch request is only issued and can only be realized in a four (4) fiber bidirectional line-switched ring transmission system 100. Ring node 104 recognizes that the line-switch request message $SF_L/102$ in the incoming APS channel K1 byte does not identify an adjacent ring node and passes the line-switch request message on to ring node 103. Similarly, ring node 103 passes the line-switch request message on to ring node 102. In turn, ring node 102 recognizes its own ID in the $SF_L/102$ line-switch request message, which indicates to ring node 102 that a ring node has not failed. Since there was no ring node failure, there is no need to squelch any of the communication circuits active in ring node 102. Ring node 102 does, however, effect a loop-back-switch of line-switched communications circuits received at the ring node in the service bandwidth on transmission path 120 to the protection bandwidth on transmission path 110 for communications circuits intended for other ring nodes in ring 100. Ring node 102 also effects a ring loop-back-switch of line-switched communications circuits entering the node that were intended to be transmitted in the service bandwidth on transmission path 120 to the protection bandwidth on transmission path 110. Any communication circuits received at ring node 102 that are intended to be dropped from either the service bandwidth or protection bandwidth on transmission path 120, are supplied to interface 224 (FIG. under control of controller 205, as described above. Any communications circuits to be path-switched are path-switched at their termination ring nodes if the current path selections are affected by the failure.

Similarly, ring node 102 detects a loss-of-signal from ring node 101 on transmission path 110 because of the failure in transmission paths 110 and 120 between ring nodes 101 and 102. Then, ring node 102 transmits a line-switch request message identifying the signal from ring node 101 as having failed in the APS channel K1 byte on transmission path 110. This line-switch request message is designated $SF_L/101$. Ring node 102 also transmits a span-switch request message in the APS channel K1 byte on transmission path 120 towards the failure. The span-switch request message is designated $SF_S/101$. Again, it should be noted that a span-switch request is only issued and can only be realized in a four (4) fiber bidirectional line-switched ring transmission system 100. Ring node 103 recognizes that the line-switch request $SF_L/101$ in the incoming APS channel K1 byte does not identify an adjacent ring node and passes the line-switch request message on to ring node 104. Similarly, ring node 104 passes the line-switch request message on to ring node 101. In turn, ring node 101 recognizes its own ID in the $SF_L/101$ line-switch request message, which indicates to ring node 101 that a ring node has not failed. Since there was no ring node failure, there is no need to squelch any of the communication circuits active in ring node 101. Ring node 101 does, however, effect a loop-back-switch of line-switched communications circuits received at the ring node in the service bandwidth on transmission path 110 to the protection bandwidth on transmission path 120 for communications circuits intended for other ring nodes in ring 100. Ring node 101 effects a ring loop-back-switch of line-switched communications circuits entering the node that were intended to be transmitted in the service bandwidth on transmission path 110 to the protection bandwidth on transmission path 120. Any communications circuits received at ring node 101 that are intended to be dropped from either the service bandwidth or protection bandwidth on transmission path 110, are supplied as described above, under control of controller 205 to interface 224 (FIG. 2). Any communications circuits to be path-switched are path-switched at their termination ring nodes if the current path selections are affected by the failure.

Figure 10:
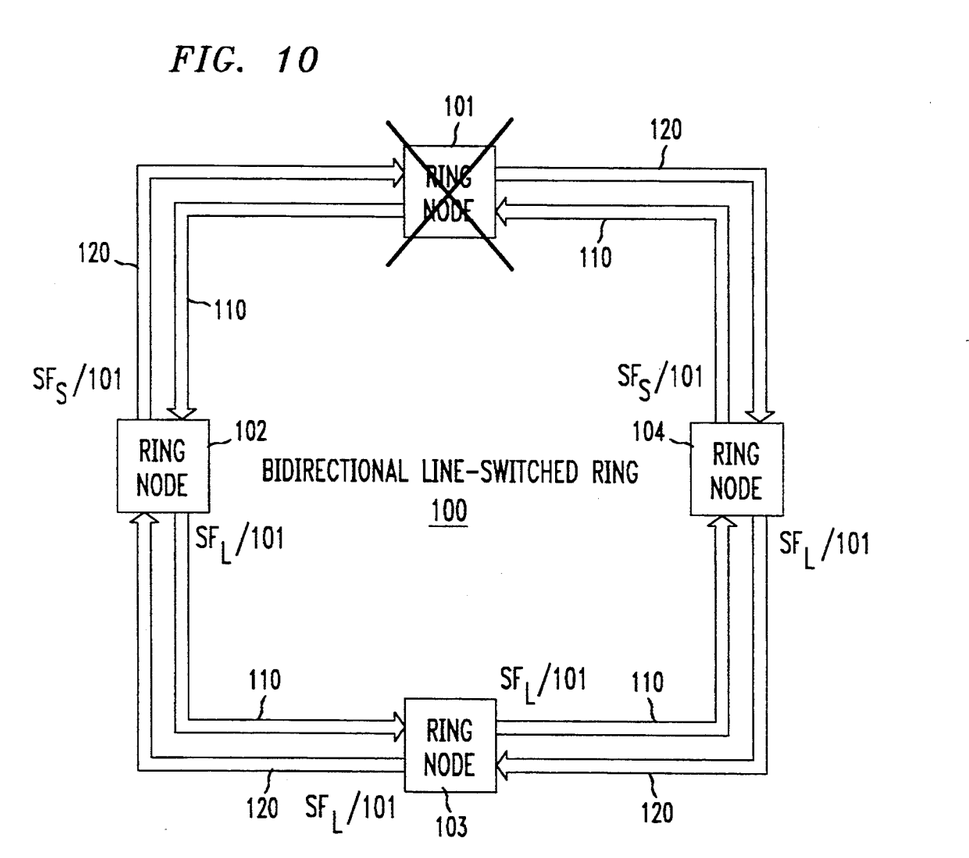
FIG. 10 illustrates the failure message transmission for a single ring node failure in the bidirectional line-switched ring transmission system.

FIG. 10 illustrates the failure message transmission in the automatic protection switch (APS) channel via the K1 byte for a single ring node failure in bidirectional line-switched ring 100. In this example, the failure is shown as being in ring node 101. Ring node 102 detects a loss-of-signal from ring node 101 on transmission path 110 because of the failure of node 101. Then, ring node 102 transmits a line-switch request message identifying the signal from ring node 101 as having failed in the APS channel K1 byte on transmission path 110 away from the failure toward ring node 103. This line-switch request signal is designated $SF_L/101$. Ring node 102 also transmits a span-switch request message from the APS channel K1 byte on transmission paths 120 towards failed node 101. The span-switch request message is designated $SF_S/101$. As indicated above, a span-switch is only issued and can only be realized in a four (4) fiber bidirectional line-switched ring transmission system 100. Ring node 103 recognizes that the line-switch request message $SF_L/101$ in the incoming APS channel K1 byte does not identify an adjacent ring node and, therefore, passes the line-switch request message on to ring node 104. Ring node 104 recognizes that the line-switch request message $SF_L/101$ includes the ID of the adjacent failed ring node 101. A single node failure is indicated because ring node 104 has also detected loss-of-signal from ring node 101 on transmission path 120. Consequently, ring node 104, under control of controller 205 (FIG. 2), causes all active line-switched communications circuits in ring node 104 intended for ring node 101 to be squelched. The squelching is realized as described above in conjunction with FIG. 2 and the process of FIG. 8. Specifically, referring to the communications circuit ID table for ring node 104 in FIG. 6 or FIG. 7, it is seen that communications circuits STS-M (c) and STS-M (d) are to be squelched. Line-switched communications circuit STS-M (b) is identified as not being terminated in ring node 101 and, therefore, no squelching is effected for it. Thus, communications circuit STS-M(b) is ring loop-back-switched in ring node 104 to the protection bandwidth on transmission path 120 and supplied thereon to ring node 102 where it is appropriately dropped, in the manner described above. Path-switched communications circuits STS-M(e) and STS-M(f) are path-switched at their terminations if the current path selections are affected by the failure of ring node 101. The mechanics and process for effecting path-switching are well known to those skilled in the art. Communications circuit STS-M(f) is not affected by the failure of node 101 and communications between ring nodes 103 and 104 are realized in normal fashion.

As indicated above, ring node 104 detects a loss-of-signal on transmission path 120 from failed ring node 101. Then, ring node 104 transmits a line-switch request message identifying the signal from ring node 101 as having failed in the APS channel K1 byte on transmission path 120 away from the failure toward ring node 103. Again, this line-switch request message is designated $SF_L/101$. Ring node 104 also transmits a span-switch request message in the APS channel K1 byte on transmission path 110 towards the failed node 101. The span-switch request message is designated $SF_S/101$. As indicated above, a span-switch can only be realized in a four (4) fiber bidirectional line-switched ring transmission system 100. Ring node 103 recognizes that the line-switch request $SF_L/101$ incoming in the APS channel on transmission path 120 does not identify an adjacent failed node and passes the line-switch request message on to ring node 102. Ring node 102 recognizes that the line-switch request message includes the ID of an adjacent failed ring node, namely, ring node 101. A single ring node failure is indicated because ring node 102 has detected loss-of-signal from ring node 101 and has received a line-switch request message identifying node 101 as having failed. Consequently, ring node 102 will squelch all active line-switched communications circuits intended for ring node 101. Line-switched communications circuits terminated in others of the ring nodes in ring 100 are appropriately bridged and loop-back-switched as required to "heal" the ring 100. As indicated above, communications circuits to be path-switched are path-switched at their termination ring nodes if the current path selections are affected by the failure.

The above-described arrangements are, of course, merely illustrative of the application of the principles of the invention. Other arrangements may be devised by those skilled in the art without departing from the spirit or scope of the invention. For example, it will be apparent to those skilled in the art that a particular communications circuit, i.e., tributary, on the ring could be segmented into portions which can be line-switched, path-switched, span-switched or not switched, i.e., left unprotected with appropriate priorities assigned to the portions and the type of switching, as desired. It will also be apparent that the bidirectional ring transmission system can support only path-switching of some communications circuits while leaving others unprotected. Additionally, it will be apparent that a four (4) fiber bidirectional ring transmission system can support path-switching of some of the communications circuits and span-switching of others. Finally, the four (4) fiber bidirectional ring transmission system can also support span-switching of some of the communications circuits and leaving others unprotected.

I claim:

1. A ring node for use in a bidirectional ring transmission system having a plurality of ring nodes interconnected by first and second transmission paths, the first transmission path transporting communication circuits around the ring transmission system from ring node to ring node in a first direction and the second transmission path transporting communications circuits around the ring transmission system from ring node to ring node in a second direction opposite the first direction, the ring node comprising:

means for storing entries identifying communications circuits active in the ring node, a ring node on which each active circuit is terminated, as well as, a protection switching indication for each active communications circuit to identify which, if any, of said active communication circuits are to be protection switched;

means for monitoring signals incoming to the ring node to determine whether one or more ring nodes adjacent to this ring node have failed and for determining the identity of said failed one or more ring nodes; and means responsive to said entries, and to said monitoring means for selectively protection switching on a communications circuit-by-communications circuit basis only those communications circuits in this ring node which are to be protected thereby leaving selected bandwidth in said ring transmission system unprotected.

2. The invention as defined in claim 1 wherein said bidirectional ring transmission system includes four (4) optical fibers two (2) of said optical fibers being employed for said first transmission path and two (2) of said optical fibers being employed for said second transmission path, said protection switching indication indicates whether a particular affected communications circuit should be line-switched or span-switched, and said means for protection switching is further responsive to said protection switching indication to either line-switch or span-switch said particular affected communications circuit as indicated by said protection switching indication.

3. The invention as defined in claim 1 wherein said protection switching indication indicates whether a particular affected communications circuit should be line-switched or not switched at all, i.e., left unprotected, and wherein said means for protection switching is further responsive to said protection switching indication to either line-switch or not switch, i.e., leave unprotected, said particular affected communications circuit as indicated by said protection switching indication.

4. The invention as defined in claim 3 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched only, and wherein said means for protection switching is further responsive to said protection switching indication to either line-switch, span-switch or not switch at all, i.e., leave unprotected, said particular affected communications circuit as indicated by said protection switching indication.

5. The invention as defined in claim 1 wherein said protection switching indication indicates whether a particular affected communications circuit should be line-switched or path-switched, and wherein said means for protection switching is further responsive to said protection switching indication to either line-switch or path-switch said particular affected communications circuit as indicated by said protection switching indication.

6. The invention as defined in claim 5 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched only, and wherein said means for protection switching is further responsive to said protection switching indication to either line-switch, path-switch or span-switch said particular affected communications circuit as indicated by said protection switching indication.

7. The invention as defined in claim 5 wherein said protection switching indication further indicates whether a particular affected communications circuit should not be switched at all, i.e., left unprotected, and wherein said means for protection switching is further responsive to said protection switching indication to either line-switch, path-switch or not switch at all, i.e., leave unprotected, said particular affected communications circuit as indicated by said protection switching indication.

8. The invention as defined in claim 7 wherein said bidirectional ring transmission system includes four (4) optical fibers two (2) of said optical fibers being employed for said first transmission path and two (2) of said optical fibers being employed for said second transmission path, wherein said protection switching indication further indicates whether a particular affected communications circuit should be span-switched only, and wherein said means for protection switching is further responsive to said protection switching indication to either line-switch, path-switch, span-switch or not switch at all, i.e., leave unprotected, said particular affected communications circuit as indicated by said protection switching indication.

9. The invention as defined in claim 1 wherein said bidirectional ring transmission system includes four (4) optical fibers two (2) of said optical fibers being employed for said first transmission path and two (2) of said optical fibers being employed for said second transmission path, said protection switching indication indicates whether a particular affected communications circuit should be path-switched or span-switched, and said means for protection switching is further responsive to said protection switching indication to either path-switch or span-switch said particular affected communications circuit as indicated by said protection switching indication.

10. The invention as defined in claim 1 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched or not switched at all, i.e. left unprotected, and wherein said means for protection switching is further responsive to said protection switching indication to either span-switch or not switch at all, i.e., leave unprotected, said particular affected communications circuit as indicated by said protection switching indication.

11. The invention as defined in claim 1 wherein said protection switching indication indicates whether a particular affected communications circuit should be path-switched or not switched at all, i.e., left unprotected, and wherein said means for protection switching is further responsive to said protection switching indication to either path-switch or not switch, i.e., leave unprotected, said particular affected communications circuit as indicated by said protection switching indication.

12. The invention as defined in claim 11 wherein said bidirectional ring transmission system includes four (4) optical fibers two (2) of said optical fibers being employed for said first transmission path and two (2) of said optical fibers being employed for said second transmission path, wherein said protection switching indication further indicates whether a particular affected communications circuit should be span-switched, and wherein said means for protection switching is further responsive to said protection switching indication to either, path-switch, span-switch or not switch at all, i.e., leave unprotected, said particular affected communications circuit as indicated by said protection switching indication.

13. A bidirectional ring transmission system including:
 a plurality of ring nodes;
 a first transmission path interconnecting said plurality of ring nodes and transporting communications circuits around the ring transmission system from ring node to ring node in a first direction of transmission;
 a second transmission path interconnecting said plurality of ring nodes and transporting communications circuits around the ring transmission system from ring node to ring node in a second direction of transmission opposite the first direction of transmission;
 each of said plurality of ring nodes comprising:
  means for storing entries identifying communications circuits active in the ring node, a ring node on which each active circuit is terminated, as well as, a protection switching indication for each active communications circuit to identify which, if any, of said active communication circuits are to be protection switched;
  means for monitoring signals incoming to the ring node to determine whether one or more ring nodes adjacent to this ring node have failed and for determining the identity of said failed one or more ring nodes; and
  means responsive to said entries, and to said monitoring means for selectively protection switching on a communications circuit-by-communications circuit basis only those communications circuits in this ring node which are to be protected thereby leaving selected bandwidth in said ring transmission system unprotected.

14. The invention as defined in claim 13 wherein said bidirectional ring transmission system includes four (4) optical fibers two (2) of said optical fibers being employed for said first transmission path and two (2) of said optical fibers being employed for said second transmission path, said protection switching indication indicates whether a particular affected communications circuit should be line-switched or span-switched, and said means for protection switching is further responsive to said protection switching indication to either line-switch or span-switch said particular affected communications circuit as indicated by said protection switching indication.

15. The invention as defined in claim 13 wherein said protection switching indication indicates whether a particular affected communications circuit should be line-switched or not switched at all, i.e., left unprotected, and wherein said means for protection switching is further responsive to said protection switching indication to either line-switch or not switch, i.e., leave unprotected, said particular affected communications circuit as indicated by said protection switching indication.

16. The invention as defined in claim 15 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched only, and wherein said means for protection switching is further responsive to said protection switching indication to either line-switch, span-switch or not switch at all, i.e., leave unprotected, said particular affected communications circuit as indicated by said protection switching indication.

17. The invention as defined in claim 13 wherein said protection switching indication indicates whether a particular affected communications circuit should be line-switched or path-switched, and wherein said means for protection switching is further responsive to said protection switching indication to either line-switch or path-switch said particular affected communications circuit as indicated by said protection switching indication.

18. The invention as defined in claim 17 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched only, and wherein said means for protection switching is further responsive to said protection switching indication to either line-switch, path-switch or span-switch said particular affected communications circuit as indicated by said protection switching indication.

19. The invention as defined in claim 17 wherein said protection switching indication further indicates whether a particular affected communications circuit should not be switched at all, i.e., left unprotected, and wherein said means for protection switching is further responsive to said protection switching indication to either line-switch, path-switch or not switch at all, i.e., leave unprotected, said particular affected communications circuit as indicated by said protection switching indication.

20. The invention as defined in claim 19 wherein said bidirectional ring transmission system includes four (4) optical fibers two (2) of said optical fibers being employed for said first transmission path and two (2) of said optical fibers being employed for said second transmission path, wherein said protection switching indication further indicates whether a particular affected communications circuit should be span-switched only, and wherein said means for protection switching is further responsive to said protection switching indication to either line-switch, path-switch, span-switch or not switch at all, i.e., leave unprotected, said particular affected communications circuit as indicated by said protection switching indication.

21. The invention as defined in claim 13 wherein said bidirectional ring transmission system includes four (4) optical fibers two (2) of said optical fibers being employed for said first transmission path and two (2) of said optical fibers being employed for said second transmission path, said protection switching indication indicates whether a particular affected communications circuit should be path-switched or span-switched, and said means for protection switching is further responsive to said protection switching indication to either path-switch or span-switch said particular affected communications circuit as indicated by said protection switching indication.

22. The invention as defined in claim 13 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched or not switched at all, i.e. left unprotected, and wherein said means for protection switching is further responsive to said protection switching indication to either span-switch or not switch at all, i.e., leave unprotected, said particular affected communications circuit as indicated by said protection switching indication.

23. The invention as defined in claim 13 wherein said protection switching indication indicates whether a particular affected communications circuit should be path-switched or not switched at all, i.e., left unprotected, and wherein said means for protection switching is further responsive to said protection switching indication to either path-switch or not switch, i.e., leave unprotected, said particular affected communications circuit as indicated by said protection switching indication.

24. The invention as defined in claim 23 wherein said bidirectional ring transmission system includes four (4) optical fibers two (2) of said optical fibers being employed for said first transmission path and two (2) of said optical fibers being employed for said second transmission path, wherein said protection switching indication further indicates whether a particular affected communications circuit should be span-switched, and wherein said means for protection switching is further responsive to said protection switching indication to either, path-switch, span-switch or not switch at all, i.e., leave unprotected, said particular affected communications circuit as indicated by said protection switching indication.

25. A bidirectional ring transmission system including:
a plurality of ring nodes;
a first transmission path interconnecting said plurality of ring nodes and transporting communications circuits around the ring transmission system from ring node to ring node in a first direction of transmission;

a second transmission path interconnecting said plurality of ring nodes and transporting communications circuits around the ring transmission system from ring node to ring node in a second direction of transmission opposite the first direction of transmission;

a method of protection switching only communications circuits to be protected comprising the steps of:

provisioning in each of said plurality of ring nodes entries identifying communications circuits active in the ring node, a ring node on which each active circuit is terminated, as well as, a protection switching indication for each active communications circuit to identify which, if any, of said active communication circuits are to be protection switched;

monitoring signals incoming to the ring node to determine whether one or more ring nodes adjacent to this ring node have failed;

determining the identity of said failed one or more ring nodes; and determining in response to said entries which, if any, of said active communications circuits in the ring node are terminated in said failed one or more ring nodes; and selectively protection switching on a communications circuit-by-communications circuit basis in response to said entries only those communications circuits in this ring node which are to be protected thereby leaving selected bandwidth in said ring transmission system unprotected.

26. The invention as defined in claim 25 wherein said bidirectional ring transmission system includes four (4) optical fibers two (2) of said optical fibers being employed for said first transmission path and two (2) of said optical fibers being employed for said second transmission path, said protection switching indication indicates whether a particular affected communications circuit should be line-switched or span-switched, and said step of protection switching is further responsive to said protection switching indication to either line-switch or span-switch said particular affected communications circuit as indicated by said protection switching indication.

27. The invention as defined in claim 25 wherein said protection switching indication indicates whether a particular affected communications circuit should be line-switched or not switched at all, i.e., left unprotected, and wherein said step of protection switching is further responsive to said protection switching indication to either line-switch or not switch, i.e., leave unprotected, said particular affected communications circuit as indicated by said protection switching indication.

28. The invention as defined in claim 27 wherein said bidirectional ring transmission system includes four (4) optical fibers two (2) of said optical fibers being employed for said first transmission path and two (2) of said optical fibers being employed for said second transmission path, wherein said protection switching indication further indicates whether a particular affected communications circuit should be span-switched only, and wherein said step of protection switching is further responsive to said protection switching indication to either line-switch, span-switch or not switch at all, i.e., leave unprotected, said particular affected communications circuit as indicated by said protection switching indication.

29. The invention as defined in claim 25 wherein said protection switching indication indicates whether a particular affected communications circuit should be line-switched or path-switched, and wherein said step of protection switching is further responsive to said protection switching indication to either line-switch or path-switch said particular affected communications circuit as indicated by said protection switching indication.

30. The invention as defined in claim 29 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched only, wherein said step of protection switching is further responsive to said protection switching indication to either line-switch, path-switch or span-switch said particular affected communications circuit as indicated by said protection switching indication.

31. The invention as defined in claim 29 wherein said protection switching indication further indicates whether a particular affected communications circuit should not be switched at all, i.e., left unprotected, and wherein said step of protection switching is further responsive to said protection switching indication to either line-switch, path-switch or not switch at all, i.e., leave unprotected, said particular affected communications circuit as indicated by said protection switching indication.

32. The invention as defined in claim 31 wherein said bidirectional ring transmission system includes four (4) optical fibers two (2) of said optical fibers being employed for said first transmission path and two (2) of said optical fibers being employed for said second transmission path, wherein said protection switching indication further indicating whether a particular affected communications circuit should be span-switched only, and wherein said step of protection switching is further responsive to said protection switching indication to either line-switch, path-switch, span-switch or not switch at all, i.e., leave unprotected, said particular affected communications circuit as indicated by said protection switching indication.

33. The invention as defined in claim 25 wherein said bidirectional ring transmission system includes four (4) optical fibers two (2) of said optical fibers being employed for said first transmission path and two (2) of said optical fibers being employed for said second transmission path, said protection switching indication indicates whether a particular affected communications circuit should be path-switched or span-switched, and said step of protection switching is further responsive to said protection switching indication to either path-switch or span-switch said particular affected communications circuit as indicated by said protection switching indication.

34. The invention as defined in claim 25 wherein said bidirectional ring transmission system includes four (4) optical fibers two (2) of said optical fibers being employed for said first transmission path and two (2) of said optical fibers being employed for said second transmission path, and wherein said protection switching indication further indicates whether a particular affected communications circuit should be span-switched or not switched at all, i.e. left unprotected, and wherein said step of protection switching is further responsive to said protection switching indication to either span-switch or not switch at all, i.e., leave unprotected, said particular affected communications circuit as indicated by said protection switching indication.

35. The invention as defined in claim 25 wherein said protection switching indication indicates whether a particular affected communications circuit should be path-switched or not switched at all, i.e., left unprotected, and wherein said step of protection switching is further responsive to said protection switching indication to either path-switch or not switch, i.e., leave unprotected, said particular affected communications circuit as indicated by said protection switching indication.

36. The invention as defined in claim 35 wherein said bidirectional ring transmission system includes four (4) optical fibers two (2) of said optical fibers being employed for said first transmission path and two (2) of said optical fibers being employed for said second transmission path, wherein said protection switching indication further indicates whether a particular affected communications circuit should be span-switched, and wherein said step of protection switching is further responsive to said protection switching indication to either, path-switch, span-switch or not switch at all, i.e., leave unprotected, said particular affected communications circuit as indicated by said protection switching indication.

37. A method for use in a bidirectional ring transmission system having a plurality of ring nodes interconnected by first and second transmission paths, the first transmission path transporting communication circuits around the ring transmission system from ring node to ring node in a first direction and the second transmission path transporting communications circuits around the ring transmission system from ring node to ring node in a second direction opposite the first direction, the method comprising the steps of:

protection switching predetermined ones of the communications circuits which are active in an individual one of said ring nodes, and which terminate on a ring node that is adjacent thereto, upon failure of said adjacent ring node, and leaving non-protection-switched any others of said active communications circuits.

38. The invention as defined in claim 37 wherein said protection switching is carried out for different ones of said predetermined communications circuits using different respective types of protection switching.

39. The invention as defined in claim 38 wherein said different types of protection switching are selected from the group comprising line-switching, path-switching and span-switching.

40. A method for use in a bidirectional ring transmission system having a plurality of ring nodes interconnected by first and second transmission paths which transport communications circuits around the ring transmission system in respective, opposite directions, the method comprising the steps of:

storing for each of individual ones, but less than all, of the communications circuits active in a particular one of the ring nodes an indication that communications circuit is to be protection switched; and upon the failure of a ring node which is adjacent to said particular ring node and which terminates a communications circuit that is active in said particular ring node, protection switching that communications circuit if a protection switching indication is stored therefor and leaving that communications circuit non-protection-switched otherwise.

* * * * *